United States Patent
Davis

(10) Patent No.: US 11,080,867 B2
(45) Date of Patent: Aug. 3, 2021

(54) MOTION-CONSTRAINED, MULTIPLE-HYPOTHESIS, TARGET-TRACKING TECHNIQUE

(71) Applicant: United States of America as Represented by The Secretary of The Army, Alexandria, VA (US)

(72) Inventor: Austin V Davis, Clinton, MS (US)

(73) Assignee: UNITED STATES of AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 16/239,399

(22) Filed: Jan. 3, 2019

(65) Prior Publication Data
US 2020/0219271 A1    Jul. 9, 2020

(51) Int. Cl.
| | |
|---|---|
| *G06N 20/20* | (2019.01) |
| *G06T 7/277* | (2017.01) |
| *A01M 31/00* | (2006.01) |
| *A01K 29/00* | (2006.01) |
| *H04N 5/33* | (2006.01) |

(52) U.S. Cl.
CPC ............ *G06T 7/277* (2017.01); *A01K 29/005* (2013.01); *A01M 31/002* (2013.01); *G06T 2207/10048* (2013.01); *G06T 2207/30242* (2013.01); *H04N 5/33* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0127774 A1* | 6/2007 | Zhang | .............. | G08B 13/19602 382/103 |
| 2009/0033745 A1* | 2/2009 | Yeredor | ........... | G08B 13/19682 348/152 |
| 2012/0177260 A1* | 7/2012 | Su | ........................ | A61B 6/5217 382/128 |
| 2014/0313345 A1* | 10/2014 | Conard | .............. | G06K 9/00664 348/169 |
| 2016/0063344 A1* | 3/2016 | Fan | ......................... | G06T 7/246 382/103 |
| 2016/0379074 A1* | 12/2016 | Nielsen | .................. | H04N 7/181 348/143 |

(Continued)

*Primary Examiner* — Cindy Trandai
(74) *Attorney, Agent, or Firm* — Brian C. Jones

(57) ABSTRACT

In one embodiment, an infrared camera generates thermal images and a computer generates track trees for volant targets (e.g., bats) detected in the images using an HKUF technique and detection filtering. The computer extends each track tree by adding new branches for each target detected in a subsequent image, generates motion metrics for each new branch, applies biologically informed motion constraints to the motion metrics to delete branches from the track trees, selects a track in each terminated track tree as a most likely track for the corresponding detected target using a track-scoring system based on a combination of track tortuosity and Kalman prediction errors, automatically generates a counting box based on density plots generated using the selected tracks, and calculates a census of the volant targets based on the selected tracks relative to the counting box. The technique handles targets that may be occluded for one or more images.

8 Claims, 11 Drawing Sheets

(56) References Cited

U.S. PATENT DOCUMENTS

| | | | |
|---|---|---|---|
| 2017/0017859 A1* | 1/2017 | Uchiyama | G06K 9/4671 |
| 2017/0061241 A1* | 3/2017 | Rastgar | G06K 9/6215 |
| 2018/0164431 A1* | 6/2018 | Kalyandurg | G01S 13/86 |
| 2019/0012607 A1* | 1/2019 | Holliday | G06N 20/00 |
| 2019/0026908 A1* | 1/2019 | Finn | G06T 7/277 |
| 2019/0034734 A1* | 1/2019 | Yen | G06K 9/342 |
| 2019/0057507 A1* | 2/2019 | El-Khamy | G06K 9/66 |
| 2019/0079526 A1* | 3/2019 | Vallespi-Gonzalez | G01S 17/931 |
| 2019/0122082 A1* | 4/2019 | Cuban | H04N 21/251 |
| 2019/0122381 A1* | 4/2019 | Long | G06K 9/00771 |
| 2019/0353775 A1* | 11/2019 | Kirsch | G01S 13/68 |
| 2020/0103499 A1* | 4/2020 | Preece | G01S 13/862 |
| 2020/0126248 A1* | 4/2020 | Nitzan | G06T 7/001 |

* cited by examiner

FIG. 10 CALCULATION 218

MOTION-CONSTRAINED, MULTIPLE-HYPOTHESIS, TARGET-TRACKING TECHNIQUE

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to automated, image-based, target-tracking techniques and, more particularly but not exclusively, to computer-implemented techniques for tracking volant species, such as bats, using thermal imaging.

Description of the Related Art

This section introduces aspects that may help facilitate a better understanding of the invention. Accordingly, the statements of this section are to be read in this light and are not to be understood as admissions about what is prior art or what is not prior art.

Motivated by mandates of the Endangered Species Act of 1973, the census of roost-dwelling volant wildlife (e.g., bat and bird species) is essential for monitoring populations of threatened, endangered, and at-risk species. Thermal infrared imaging cameras have already been used to locate, track, and census bat and bird species within their habitats. See, e.g., Melton, Riley Eddie, Bruce M. Sabol, and Alison Sherman, "Poor Man's Missile Tracking Technology: Thermal IR Detection and Tracking of Bats in Flight," International Society for Optics and Photonics. 5811:24-34 (2005) ("Melton 2005"), the teachings of which are incorporated herein by reference in their entirety. See, also, Sabol, Bruce M., and M. Keith Hudson, "Technique Using Thermal Infrared-Imaging for Estimating Populations of Gray Bats." Journal of Mammalogy, 76 (4): 1242-48 (1995) and U.S. Pat. No. 8,116,527, the teachings of both of which are incorporated herein by reference in their entireties.

The T3 system described in Melton 2005 uses a thermal infrared imager set up near the entrance of a roost site to count ingressing and egressing individuals. The T3 system begins with frame differencing and thresholding to identify potential wildlife observed by thermal imagery. The imagery is searched for contiguous clusters of pixels using a recursive region-growing algorithm. Each cluster of pixels is considered a target candidate. Aspects of the species' wing configuration can also be used to identify target volant wildlife.

In the T3 system, identified clusters are logically associated over consecutive frames to compose tracks. The tracks are then used to determine if a target crossed the boundary of a manually defined count box drawn on the image by the user. If the target did enter or exit the count box, then a population estimate can be determined.

The development of the T3 system was considered both a technical and methodological breakthrough in the way population estimates can be determined at roosts with large numbers of individuals (e.g., >10,000). The T3 system was developed for non-real-time computing using commercial thermal imagers available to consumers at the time of its release. Unfortunately, the T3 system is plagued by unnecessary biases due to the tracking methodology used. Further, the T3 system does not guarantee any significant degree of confidence in tracking a single individual in the context of many other individuals. The T3 system performs poorly in situations of occlusion and in complex environments. The T3 system requires substantial user interaction and, in many cases, the time required to analyze collected data to perform the census takes longer than the data collection period, often by an order of magnitude.

As outlined in Melton 2005, the T3 method for conducting volant wildlife census using thermal infrared imaging technology relies on uncooled microbolometer focal plane array detectors. The T3 system uses an imager with a frame size of 320×256 pixels, a pixel bit-depth of 12 bits, and a frame rate of 30 Hz, and records to a 4 mm digital videotape. Depending on the imager's placement at a roost site, the number of pixels each volant individual will occupy changes as the individual moves closer or farther from the imager, such that size of an individual should be considered as a factor during track formation. Once the data is collected, it is digitized for further analysis by a computer.

The T3 system relies on a "stable" background that has low temporal variability from frame to frame (e.g., little or no moving vegetation). Simple frame differencing is used to isolate body and wing motions of volant individuals. A threshold filter is also applied that filters pixels that may represent false positive detections. Next, the absolute value of the differenced image is taken, and positive regions are selected through a region-growing recursive search algorithm. See, e.g., Wikipedia, https://en.wikipedia.org/w/index.php?title=Region_growing&oldid=829050359 (2018), the teachings of which are incorporated herein by reference in their entirety. The detected clusters are associated with the frame number of occurrence, clock time of occurrence, width, height, and geometric center. Polarity information is also collected to determine how the objects changed the scene from frame to frame. If polarity information is used, then it is used to classify the clusters as wing or body. Adjacent wing and body clusters are unified and treated as a single volant target. Polarity of the body and wings can differ, especially when the wings are cooler than background, and the body is warmer than the background (and vice versa).

According to Melton 2005, once cluster detection is complete, a four-phased approach to tracking is employed. Four lists (a Pixel Cluster list, a Potential list, a Tracking list, and a Target list) are used to develop a track that a volant individual takes by aggregating a set of clusters detected in sequential frames. Clusters from a pair of consecutive frames are matched one-to-one through a Kalman filter prediction of its motion vector. If a target becomes occluded by a stationary foreground object, then the Kalman filter is extended out for a user-specified series of frames (generally <5 frames) until the track is ended. Clusters that do not have a one-to-one match are used to construct new targets. These new targets are added to a Potential List from a Pixel Cluster List. The initial motion vector is constructed by identifying adjacent negative and positive cluster pairs in the differenced frame result. Whether or not two clusters are joined to represent a motion vector for a single volant individual is dependent upon the camera's field of view (FoV) dimensions and the target's expected size; however, the user must specify this size. The Potential List is filtered with each consecutive frame to enable its items to either become listed on the Tracking List or be removed from further consideration. Once a member of the Tracking List exists for a user-specified number of frames, the member is considered a positive detection of a volant individual, and a track is made of the volant individual. Once the track is complete, the member is added to the Target List. The Target List considers a series of clusters to be a Target only if a track can be formed that successfully unifies them.

The result is a list of tracks developed incrementally that is then filtered to ensure that each track exists for a sufficient number of frames and that the target moves sufficiently across the image (as specified by the user). The filtered list is then fed forward into a post-processing step. The post-processing step uses user-specified count boxes to perform counts based on track characteristics. If a track originates in a count box and terminates outside of the count box, then the population estimate is decremented. If the track originates outside of the count box and terminates inside of the count box, then the population estimate can be incremented in order to provide an estimate of net emergence.

The use of a thermal infrared imaging, uncooled microbolometer, focal plane array detector was a well-suited choice. Unfortunately, early T3 systems were bulky and reliant on tape-based storage media, which made the cameras difficult to position well at roost sites. The batteries to power such systems limited their long-term use and field deployment often required significant manual effort. Further, a population estimate could not be determined by the user until many hours (or, more commonly, weeks) after the data collection period, due to a lack of emphasis on efficient computational design. The region-growing recursive search algorithm is not data-oriented, meaning it does not leverage the natural layout of the data in the computer's memory to derive a performance advantage. The frame-differencing approach utterly fails in complex (temporally variable) environments, especially when targets are near ambient (common during bird surveys). The T3 tracking system also produces significant uncertainty because prior track history is not used during the track formation process. Therefore, without historical context, the T3 system cannot reliably track individuals except in the simplest of circumstances (e.g., constant velocity, linear flight perpendicular to the camera without any potential occlusion). Occlusion of volant individuals by other volant individuals is not well addressed by the T3 system and leads to low track fidelity (because historical information is not considered). Further, the manual input of the count-box location has been found to be extremely sensitive. If the count box is shifted slightly or its size slightly changes, then the results can be significantly different. The burden on the user to become a well-trained analyst is also not feasible, because many potential users do not have access to needed training. Additionally, the T3 system is not supported on modern computer operating systems (e.g., Windows 7, Windows 10).

SUMMARY

The present invention was developed to address the challenges described in the Background section and modernize the overall system for the user community based on a decade of further field research, user community feedback, and related research and development. A decade of research and further development has led to a novel methodological approach to tracking and census, a more-robust system design and software architecture, and a generational leap forward in population-monitoring capability.

The present invention advances the science of volant wildlife tracking and census. This disclosure describes a new tracking and census system intended to replace the T3 system. Particular focus will be placed on an algorithm called the Biologically Informed, Multiple Hypothesis Tracking Algorithm (BIMHTA) and an automated methodology for determining a count box. The automated count-box generation is enabled as a result of the novel BIMHTA approach because the system is able to derive a confidence level for identified tracks. Further, identified tracks have high fidelity to single volant individuals. This confidence can be propagated through the system to inform the system's user not only of the population estimate, but also some measure of confidence in the result. Due to the methodological approach of prior methods, the assessment of count confidence was not readily feasible. The method presented here is shown to be more robust than prior methodologies.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including." specify the presence of stated features, steps, or components, but do not preclude the presence or addition of one or more other features, steps, or components.

It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In at least one embodiment, the present invention aims to address the shortcoming of the T3 system by providing a system that can analyze the data collected at (or faster than) real time. It aims to reduce the cognitive burden on the user by leveraging new techniques and automating more aspects of the system. It provides a more-robust tracking solution that provides higher track fidelity of volant individuals. Finally, it is designed to be easily set up and deployed for long-term monitoring.

Target-Tracking System: System-Level Hardware and Processing

Figure 1:
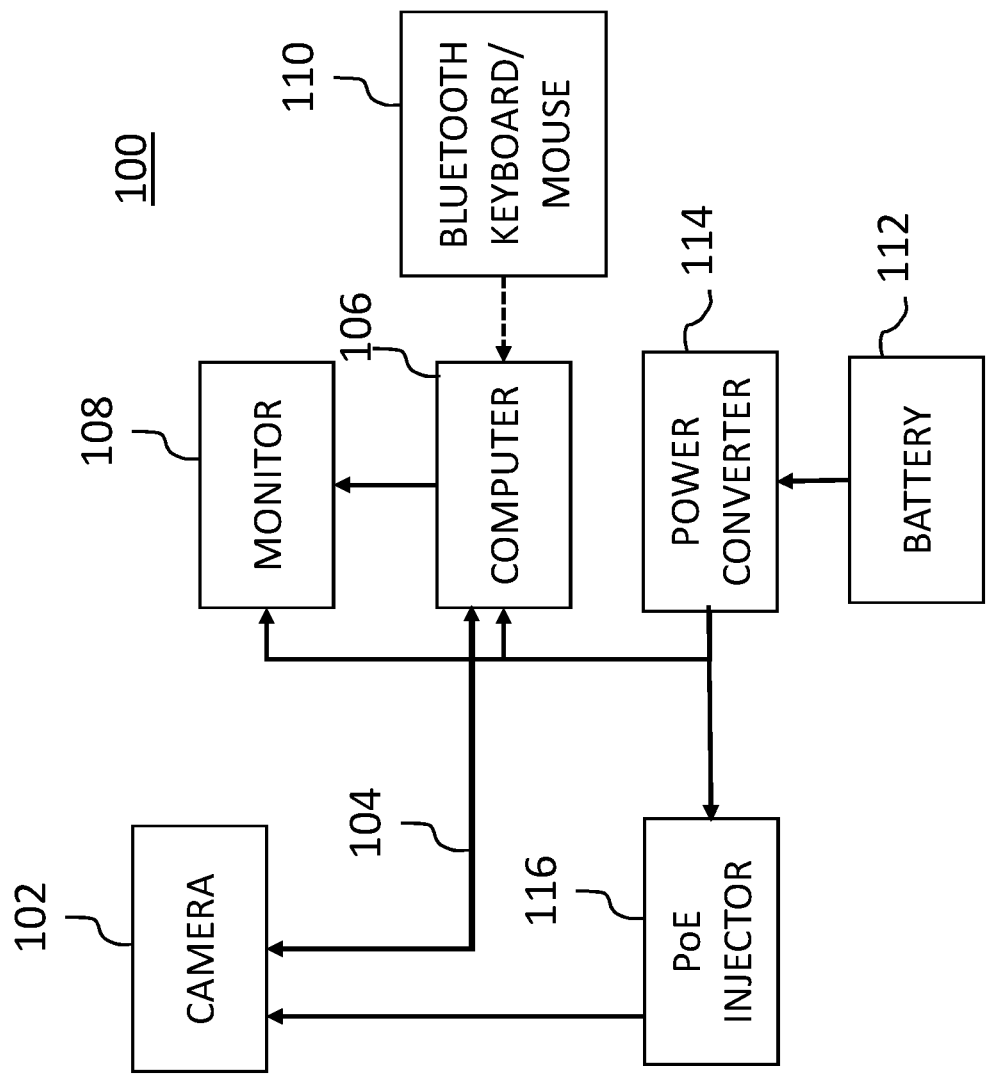
FIG. 1 is a hardware block diagram of a target-tracking system according to certain embodiments of the invention.

FIG. 1 is a hardware block diagram of a target-tracking system 100 according to certain embodiments of the invention. As shown in FIG. 1, a camera 102 (e.g., a thermal or infrared imager such as an uncooled microbolometer focal plane array) is connected by an Ethernet connection 104 to a computer 106, which has a monitor 108 and a Bluetooth keyboard/mouse 110. A battery system 112 powers (i) the computer 106 and the monitor 108 via a power converter 114 and (ii) the camera 102 via the power converter 114 and a Power over Ethernet (PoE) injector 116.

In one implementation, the camera 102 is a Tau 2 Thermal Imaging Camera from FLIR Systems, Inc., of Wilsonville, Oreg., mated with a Power-Over-Ethernet backend from Workswell s.r.o. of the Czech Republic. In another implementation, the camera 102 is an A65sc Test Kit from FLIR Systems, Inc., with a Gigabit Ethernet (GigE) interface. Each imager returns a 640×512 image array with a 14-bit bit-depth, operates at 30 Hz, and can be powered over the Ethernet connection 104 using the PoE injector 116. This allows the camera 102 to be up to about 100 m from the computer 106, which improves the potential for better camera placement (e.g., on a tripod) in rugged terrain (e.g., bluff facets, interior of a cave). The camera 102 has a relatively small form factor and uses the GigE protocol for transmitting frames over the Ethernet connection 104. In one embodiment, the computer 106 is an NUC 5th generation mini-computer from Intel Corporation of Santa Clara, Calif., that contains an i7 processor with 8 GB of RAM, and the monitor 108 is a small HDMI field monitor from Lilliput Electronics Inc. of Walnut, Calif. For recording purposes, frames may be stored on an external solid state hard drive (not shown) of any suitable size. A small, lightweight, lithium ion battery system 112 is used to power the system. All of the components of such an implementation of system 100 can be stored within a 1450 Protector Case from Pelican Products, Inc., of Torrance, Calif.

Figure 2:
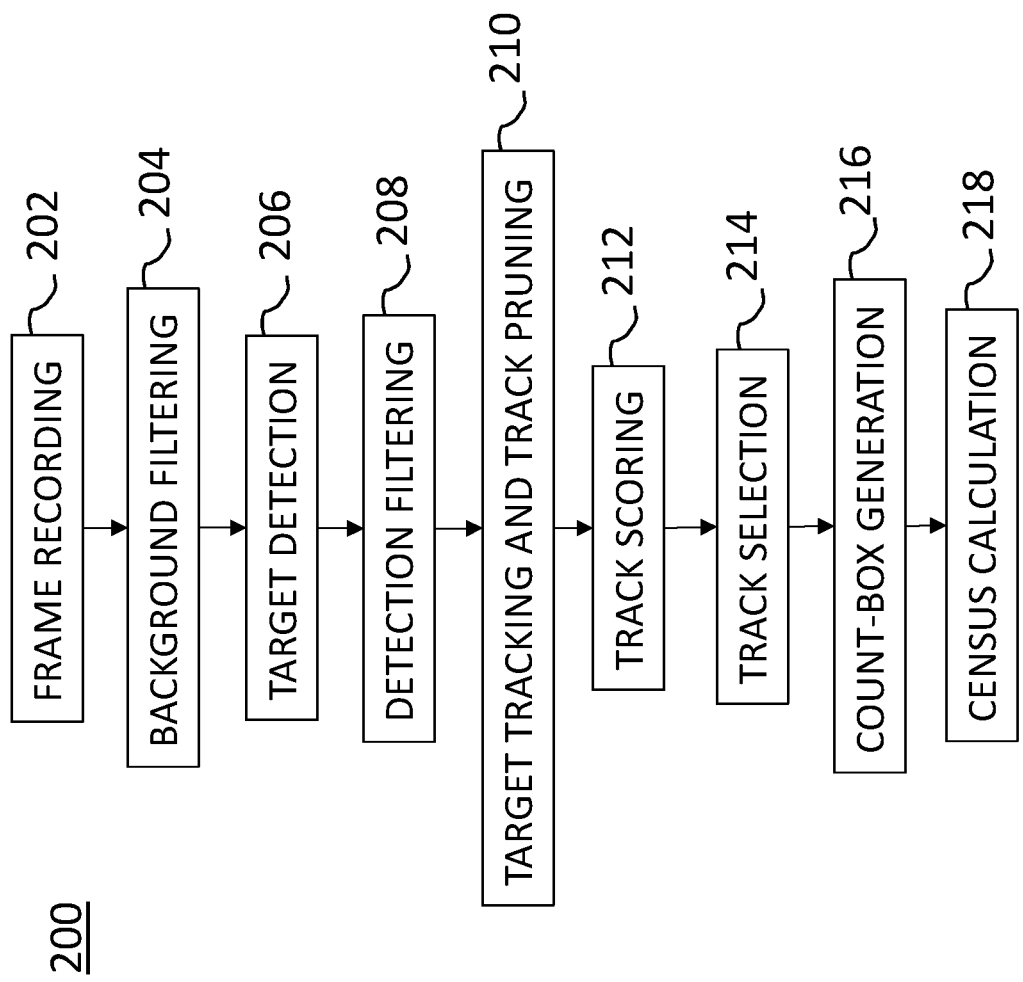
FIG. 2 is a high-level flow diagram of the processing implemented by the target-tracking system of FIG. 1.

FIG. 2 is a high-level flow diagram of the processing 200 implemented by the target-tracking system 100 of FIG. 1. The processing 200 of FIG. 2 will be described in the context of a particular application in which the target-tracking system 100 is used to determine a population of volant individuals such as bats or birds. Those skilled in the art will understand that the target-tracking system 100 can be used to track other suitable types of targets. The processing 200 involves the following steps/functions:

Frame Recording 202 during which the computer 106 acquires a sequence of frames (i.e., thermal images) from the camera 102;

Background Filtering 204 during which the computer 106 processes a current frame to filter out static background imagery;

Target Detection 206 during which the computer 106 processes the current filtered frame to detect possible targets;

Detection Filtering 208 during which the computer 106 processes the set of detected targets in the current frame to filter out unlikely targets;

Target Tracking and Track-Tree Pruning 210 during which the computer 106 processes multiple frames to generate track trees representing possible tracks for detected targets from frame to frame and then prunes those track trees to eliminate branches representing unlikely tracks;

Track Scoring 212 during which the computer 106 generates a metric for a current track in a current pruned track tree representing the likelihood that the current track represents the actual track of a target;

Track Selection 214 during which the computer 106 selects at least one track in a current track tree as representing the actual track of a corresponding target;

Count-Box Generation 216 during which the computer 106 automatically generates one or more count boxes used to determine the target population; and Census Calculation 218 during which the computer 106 determines the target population.

The processing 200 of the target-tracking system 100 can be implemented in different modes. In one possible mode, each processing step is completed for all of the frames in a frameset consisting of a fixed number of frames before the next step is initiated. In this mode, the entire frameset is recorded in step 202 before any of the frames are filtered in step 204, the entire frameset is filtered in step 204 before any of the frames are processed in step 206, and so on for all of the steps.

In another possible mode, each step is initiated as soon as possible. In this mode, as soon as the first frame is recorded in step 202, the filtering of the first frame in step 204 is initiated, while step 202 proceeds with the recording of the second frame. As soon as the filtering of the first frame is completed in step 204, the detection of targets in the filtered first frame in step 206 is initiated, while step 204 proceeds with the filtering of the second frame. And so on for each of the steps in the processing 200. Note that steps 202-208 are implemented at the frame level, while steps 210-218 are implemented over two or more frames. In this mode, the target population can continue to be estimated over different framesets corresponding to different (possibly overlapping) time periods for an indefinite duration.

Other modes are also possible in which certain subsets of the steps are processed together. For example, the frame-level processing of steps 202-208 can be completed for a finite frameset before the multi-frame processing of steps 210-218 is performed. Furthermore, although the processing 200 of FIG. 2 is described in the context of the stand-alone target-tracking system 100 of FIG. 1, in other implementations, the processing 200 can be implemented using a multi-node distributed system in which different subsets of steps 202-218 are performed by different nodes of the distributed system.

In one implementation, the code for some or all of the processing steps is written in the Rust programming language to take advantage of its native compilation capability, static garbage collection, and data-oriented characteristics (e.g., explicit memory mutability declaration). Emphasis can be placed on providing real-time or very near real-time approaches, such that iterations of the system can perform long-term monitoring deployments on small field computers.

Frame Recording

Figure 3:
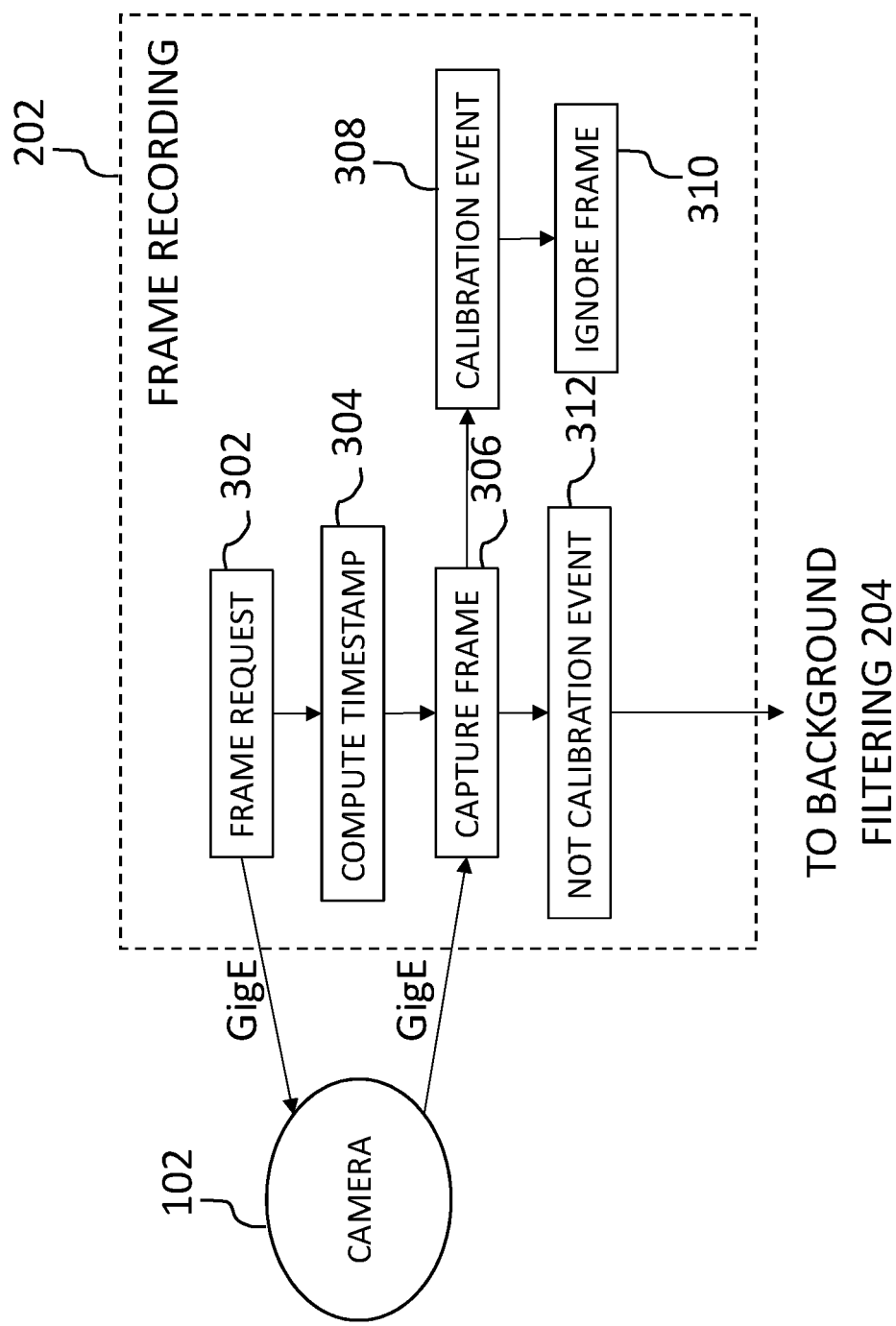
FIG. 3 is a block flow diagram illustrating the step of frame recording of FIG. 2.

FIG. 3 is a block flow diagram illustrating the step of frame recording 202 of FIG. 2. In step 302, the computer 106 requests a frame from the camera 102 using a commercially available GigE protocol via the Ethernet connection 104 and, in step 304, the computer 106 generates a timestamp that is applied, in step 306, to the captured frame that is provided by the camera 102 via the Ethernet connection 104. Certain thermal-imaging cameras periodically or intermittently generate calibration frames. If the computer 106 determines in step 308 that the captured frame is the result of such a calibration event, then the captured frame is discarded in step 310. Otherwise, the computer 106 determines in step 312 that the captured frame is not the result of a calibration event, and the captured frame is output to the step of background filtering 204 of FIG. 2.

Background Filtering

Figure 4:
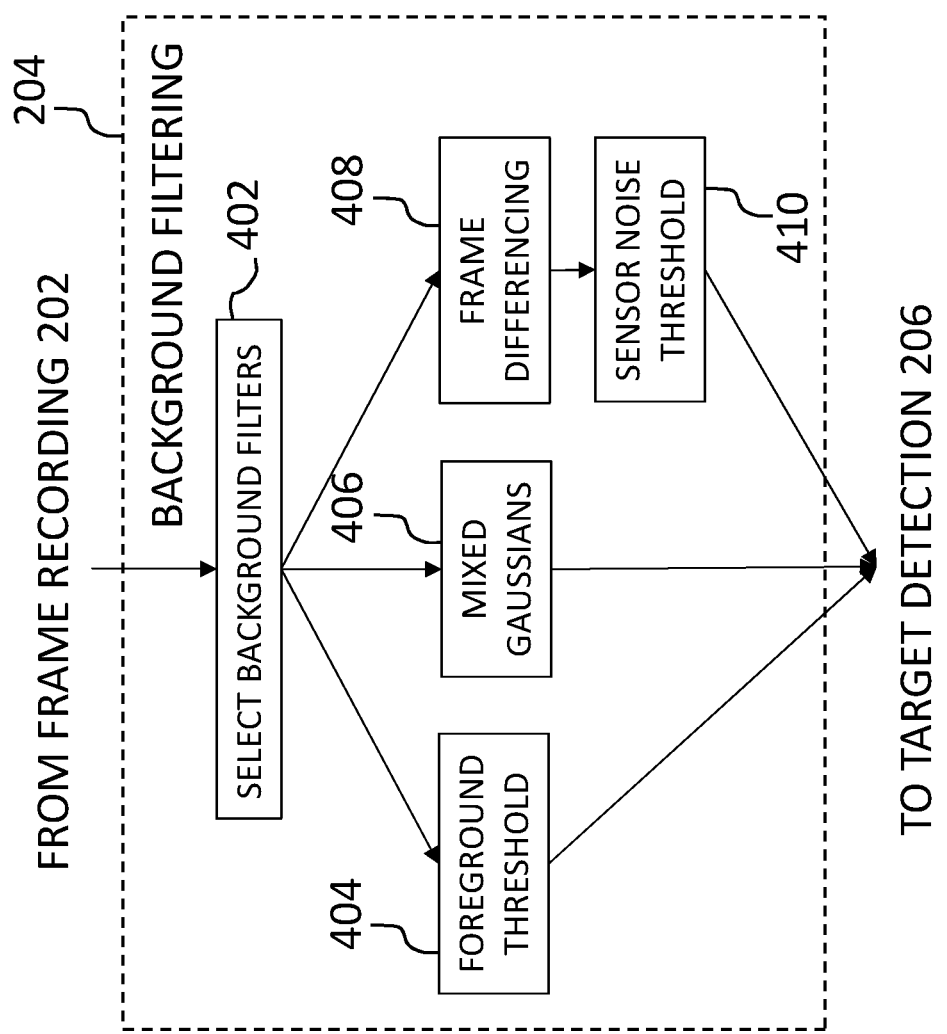
FIG. 4 is a block flow diagram illustrating the step of background filtering of FIG. 2.

FIG. 4 is a block flow diagram illustrating the step of background filtering 204 of FIG. 2. In one implementation, the processing of FIG. 4 is performed after each frame is recorded in step 202, where the computer 106 is capable of performing any one or more of three different background filtering techniques; foreground thresholding, mixed Gaussians, and frame differencing. Those skilled in the art will understand that, in alternative implementations, one or more other suitable background filtering techniques, such as (without limitation) template matching or target detection using machine learning, may be employed in addition to or instead of one or more of these three techniques.

In step 402, the computer 106 determines which background filtering techniques to perform on the current frame received from the frame recording step 202. Frame differencing is well suited for stationary backgrounds and performs well even when the volant individual's emissivity values are near-ambient conditions. In some circumstances where the background is variable, the background subtraction methodology of either foreground thresholding or mixed Gaussians generally provides better capability than frame differencing.

In a typical frame containing thermal imagery representing a number of volant individuals flying in front of a relatively static background, each individual's body is warmer than the background such that frame pixels corresponding to an individual's body are "brighter" (i.e., have greater thermal emissivity levels) than pixels corresponding to the background. In some situations, pixels corresponding to an individual's wings are also brighter than the background pixels. In some other situations, wings may be cooler than the background such that wing pixels are "darker" than the background pixels. Note that polarities can be inverted if the background has higher emissivity levels than the volant individuals.

For the foreground thresholding technique of step 404, the computer 106 applies a specified threshold level to each pixel value in the current frame, rejecting each pixel (e.g., setting the pixel value to 0) having an emissivity level below the threshold and retaining each pixel (e.g., setting each pixel value to the same, non-zero level or retaining the original pixel value, depending on the particular implementation) having an emissivity at or above the threshold. In this way, the filtered frame will have non-zero-valued pixels that correspond, for the most part, to the bodies (and maybe the wings) of one or more volant individuals. Note that there may also be a number of non-zero-valued pixels corresponding to relatively warm imagery that does not represent volant individuals.

In the mixed Gaussians technique of step 406, the computer 106 performs a conventional Mixture of Gaussian methodology to achieve background subtraction. For a description of Mixture of Gaussians approaches, see Thierry Bouwmans, Fida El Baf, and Bertrand Vachon, "Background Modeling using Mixture of Gaussians for Foreground Detection—A Survey," *Recent Patents on Computer Science*, Bentham Science Publishers. 2008, 1 (3), pp. 219-237, the teachings of which are incorporated herein by reference in their entirety.

In the case of either foreground thresholding or mixed Gaussians, the background subtraction technique results will yield only positive-polarity values because the values represent where the volant individual has moved to in the current frame, not where it originated from in the prior frame. User interaction may be needed when a background subtraction technique is used to isolate targets in front of complex non-stationary backgrounds.

For the frame differencing technique of step 408, the computer 106 generates a difference frame by subtracting a previous frame (typically, but not necessarily the immediately previous frame) from the current frame on a pixel-by-pixel basis. Pixels that are warmer in the current frame than in the previous frame will have positive polarity values in the difference frame, while pixels that are cooler in the current frame than in the previous frame will have negative polarity values in the difference frame. A positive polarity pixel may represent a frame location corresponding to a volant individual's body in the current frame and background in the previous frame. Similarly, a negative polarity pixel may represent a frame location corresponding to background in the current frame and a volant individual's body in the previous frame. Positive and negative pixels can also represent different combinations of warm bodies, cool wings, and ambient background in the current and previous frames.

After generating the difference frame, in step 410, the computer 106 applies thresholds to filter out difference pixels having values that correspond to typical sensor noise and other frame-to-frame fluctuations that do not result from the inter-frame motion of volant individuals. In some implementations, the computer 106 rejects all difference pixels whose magnitudes are below a specified minimum threshold level. In some implementations, the computer 106 also rejects all difference pixels whose magnitudes are above a specified maximum threshold level.

The results from the background filtering step 204 are provided to the target detection step 206 of FIG. 2. In one implementation, when the background filtering step 204 includes both the foreground threshold technique 404 and the mixed Gaussian technique 406, the results from those two steps are logically "AND"ed together to form a single, combined, filtered frame that is passed to the target detection step 206. Logically "AND"ing implies that the non-zero pixels in the combined frame are those that survived the filtering of both the foreground threshold technique 404 and the mixed Gaussian technique 406.

Target Detection

Figure 5:
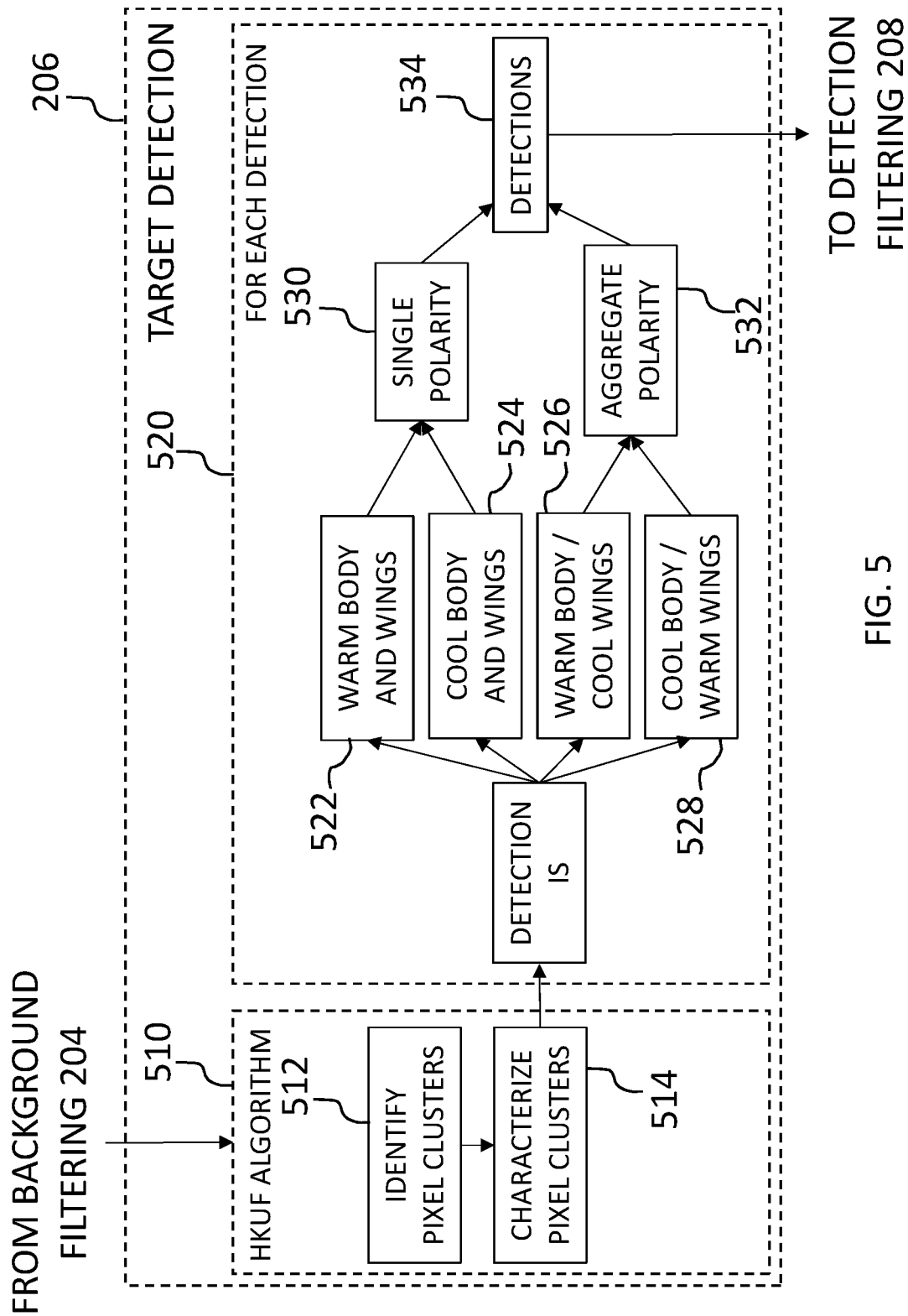
FIG. 5 is a block flow diagram illustrating the step of target detection of FIG. 2.

FIG. 5 is a block flow diagram illustrating the step of target detection 206 of FIG. 2. In one implementation, the processing of FIG. 5 is performed after each frame is filtered in step 204. Target detection 206 involves two phases: an initial phase 510 performed at the frame level to generate one or more contiguous clusters of single-polarity pixels and a subsequent phase 520 performed at the cluster level to join two or more contiguous pixel clusters together to form candidate targets potentially corresponding to volant individuals.

The initial, frame-level phase 510 involves the computer 106 applying a modified Hoshen-Koppelman Union-Find (HKUF) technique to the current filtered frame generated by the background filtering step 204 to identify (step 512) and characterize (step 514) pixel clusters corresponding to candidate targets. See Hoshen, J., and R, Kopelman, "Percolation and Cluster Distribution. I. Cluster Multiple Labeling Technique and Critical Concentration Algorithm," *Physical Review B,* 14 (8): 3438-45 (1976), the teachings of which are incorporated herein by reference in their entirety. A pixel cluster is a set of contiguous pixels having the same polarity that is surrounded by any combination of the frame edge, pixels filtered out by the background filtering step 204, and pixels having the opposite polarity (for a difference frame).

The HKUF technique is superior to the region-growing approach used in the T3 system, because the HKUF technique is data-oriented and makes a single pass over the frame imagery to identify and filter clusters, while the region-growing approach of T3 system is not data-oriented and typically requires multiple passes over the frame imagery. Data-oriented design is a program optimization approach motivated by cache coherency. T3's region-growing approach enable a relatively simple implementation that is easy to develop in software but does not make the most-efficient use of computational resources. Moreover, the region-growing technique employed in the T3 system resulted in degraded performance as a function of the number of targets in a frame. Furthermore, the computation of the region-growing approach was often slower than real-time due to the recursive search methodology employed. The application of the HKUF approach is extremely efficient, can be performed many times faster than real-time, and is not significantly dependent upon the number of targets identified in the frame.

During the cluster characterization step 514, the computer 106 determines a number of different cluster metrics for each cluster, such as (without limitation) the cluster's bounding box, geometric centroid, mean emissivity value, size (e.g., number of pixels), frame number, capture time, and/or polarity. In one possible implementation, a cluster's bounding box is the smallest rectangular region that contains the entire cluster. Note that the mean emissivity value is based on the pixel data in the original frame, not the corresponding difference frame.

The cluster-level processing of step 520 applies to difference frames generated using the frame differencing step 408 of FIG. 4, where clusters may have either positive polarity or negative polarity. When a volant individual's wings are cooler than the background, the volant individual may be represented in the difference frame by a positive-polarity duster corresponding to the individual's relatively warm body immediately adjacent to one or two negative-polarity clusters corresponding to the individual's relatively cool wings. In that case, the computer 106 will aggregate those adjacent clusters into a single, combined cluster corresponding to a single individual. Step 520 in FIG. 5 represents four different possible scenarios in difference frames:

Warm body and warm wings (relative to background) 522;
Cool body and cool wings (relative to background) 524;
Warm body and cool wings (relative to background) 526; and
Cool body and warm wings (relative to background) 528.

In scenarios 522 and 524, the individual's body and wings will be represented by a single single-polarity cluster 530, and the computer 106 treats the cluster as a detected target 534. In scenarios 526 and 528, the individual's body will be represented by a first single-polarity cluster, and the individual's wings will be represented by one or two adjacent single-but-opposite-polarity clusters, and, in step 532, the computer 106 will aggregate those clusters into a single, combined cluster that the computer 106 treats as a detected target 534. The detected targets 534 for the current frame are output to the detection filtering step 208 of FIG. 2.

Detection Filtering

Figure 6:
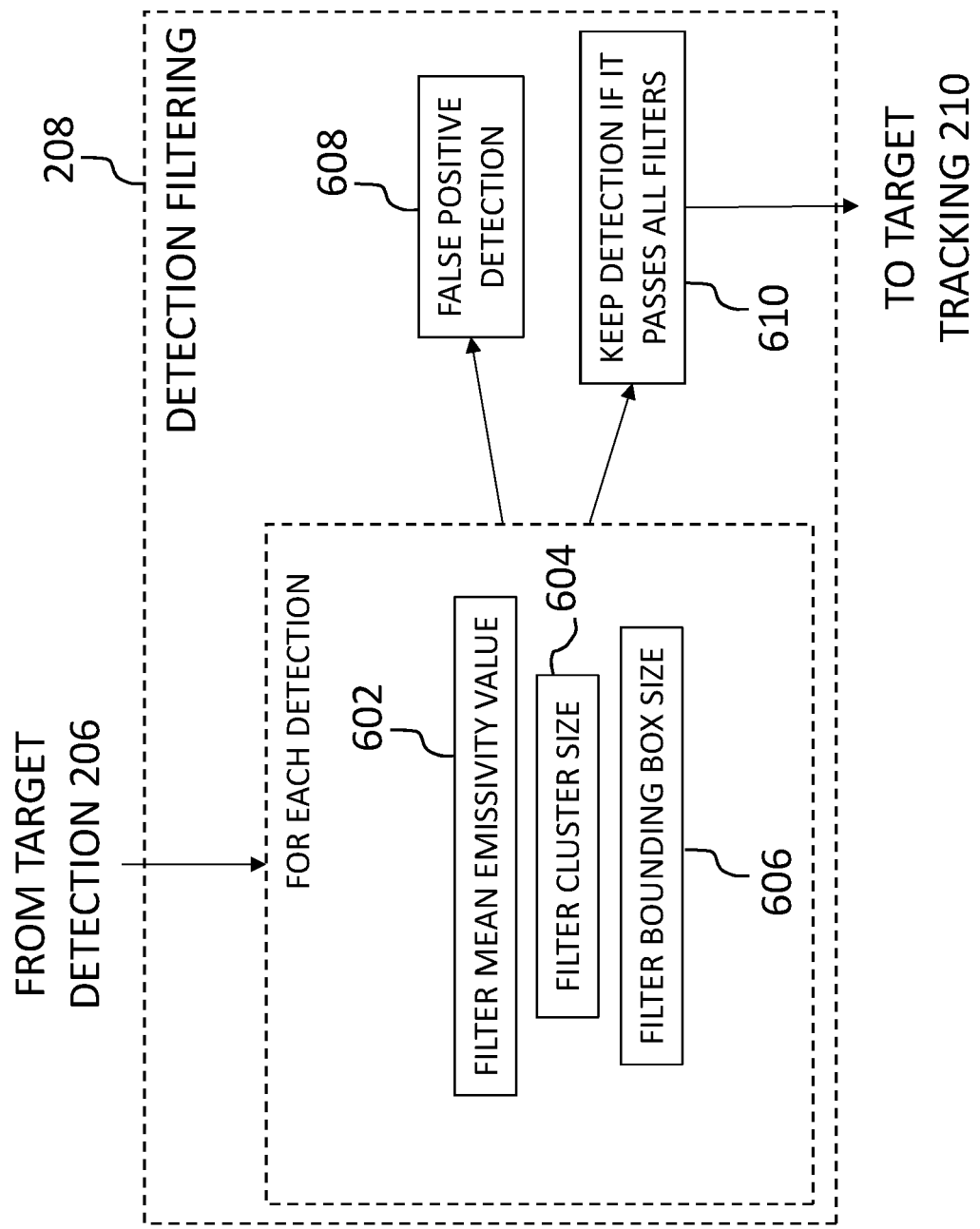
FIG. 6 is a block flow diagram illustrating the step of detection filtering of FIG. 2.

FIG. 6 is a block flow diagram illustrating the step of detection filtering 208 of FIG. 2. The detection filtering 208 of FIG. 6 is applied to each detected target 534. In one implementation, the processing of FIG. 6 is performed after each frame is completely processed in step 206. In another implementation, the processing of FIG. 6 is performed as soon as each target is detected in step 206.

In the detection filtering step 208, the computer 106 rejects a detected target 534 from the target detection step 206 of FIG. 5 if the detected target 534 does not have an appropriate value for one or more specific metrics. For example, many volant species have relatively narrow emissivity profiles (as measured by the thermal imaging camera 102 of FIG. 1), and a target's mean emissivity value can be thresholded to retain or remove the target from consideration. As such, if the computer 106 determines, in step 602, that the target's mean emissivity value is too high or too low (when compared to specified maximum and minimum emissivity threshold levels), then the computer 106 rejects the target in step 608.

The volant species of interest may also have an expected range of sizes in the thermal imagery. As such, if the computer 106 determines, in step 604, that the target size (i.e., the number of pixels in the target's cluster) is too big or too small or, in step 606, that the target's bounding box is too big or too small, then the computer 106 rejects the target in step 608.

For detected targets that pass all three filtering tests, in step 610, the computer 106 retains and outputs the target to the target tracking and track-tree pruning step 210 of FIG. 2. The detection filtering step 208 removes false positives that can be caused by moving foliage in the background or candidate targets that are too large to be considered (e.g., humans, raccoons).

Note that, for subsequent the processing of steps 210-218 in FIG. 2, each detected target in a frame is represented by a single location within the FoV. Depending on the particular implementation, the computer 106 determines that single location based on the geometric centroid of the target's pixels (either weighted by their emissivity values or unweighted) or the center of the target's bounding box or some other suitable technique.

Target Tracking and Track-Tree Pruning

The tracking method implemented by the computer 106 is markedly different from the tracking method used in the prior T3 system. The T3 system constructs tracks without the consideration of a potential track's history, pairs detection events in consecutive frames one-to-one, and does not provide any estimate of track fidelity for volant individuals.

Modern tracking approaches leverage the multiple hypothesis tracking (MHT) methodology. The classic MHT methodology operates over a fixed-size frameset. In its basic form, the MHT methodology tracks objects from frame to frame using a k-ary tree data structure (referred to herein as a "track tree") instead of a list (as in the T3 system). The MHT methodology tracks every possible track an object could make and delays a final decision until the very end. See, e.g., Kim, C., F. Li, A. Ciptadi, and J. M. Rehg, "Multiple Hypothesis Tracking Revisited." 2015 *IEEE International Conference on Computer Vision (ICCV)*, 4696-4704 (2015) ("Kim 2015"), the teachings of which are incorporated herein by reference in their entirety. The MHT methodology assumes that all the detections provided to it are the targets of interest and that no false positives exist. During the final determination of the most-likely track hypothesis, a Kalman filter is applied to each of the track hypotheses in the k-ary track tree. The track with the smallest error is commonly selected.

Unfortunately, the classic MHT methodology is limited in its applicability because: 1) target detection may include many false positives; 2) target detection may include target occlusions; 3) the complete frame dataset may be streaming and not fixed in size; 4) practical system hardware implementations are computationally limited; 5) targets may move out of the camera's FoV at any time; 6) targets may enter the camera's FoV at any time; 7) targets may vary in size depending on their proximity to the camera and on their flight paths; and 8) targets may become occluded by foreground or other targets for one or more frames, all of which violate the classic MHT methodology's basic assumptions. Existing work in the MHT literature demonstrates that track hypotheses can be split to represent new tracks and be occasionally pruned to filter out implausible tracks to improve computational efficiency. See Kim 2015 and Torabi, Atousa, and Guillaume-Alexandre Bilodeau, "A Multiple Hypothesis Tracking Method with Fragmentation Handling," *Computer and Robot Vision, CRV'09, Canadian Conference On*, 8-15 (2009), the teachings of which is incorporated herein by reference in its entirety. Even with these advancements, in order to use the MHT approach to track volant individuals, many of MHT's classic assumptions must still be rejected (e.g., that tracks can be fully enumerated over the frameset without pruning, that no new targets come into the FoV while an existing target is already being tracked, that there are no occlusions, and that there are no false positive).

Due to the frame rate of thermal imagers (>20 Hz) and the known flight characteristics of the volant individuals, it is possible to design an MHT-based methodology that is biologically informed. In doing so, the approach can address many of the shortcomings of the classic MHT methodology to enable the rejection of those same classic assumptions. Furthermore, such a biologically informed tracking system can be used as a final filtering mechanism for false positive detections of implausible tracks and improve track fidelity of volant individuals.

The tracking system 100 of FIG. 1 can be implemented to employ such a biologically informed, multiple-hypothesis tracking algorithm or BIMHTA. Detection events are provided to the BIMHTA tracking system 100 in consecutive frame-order. The BIMHTA tracking system 100 begins without any current track trees. For a first frame with one or more detected targets, the computer 106 evaluates the detected targets individually to spawn new track trees. A track tree is a tree of track hypotheses for a target. The track trees are stored as k-ary data structures in the computer's memory.

The computer 106 uses each of the individual detections in a second frame to extend each of the track trees established in the first frame. For example, if there are five detections in the first frame and five detections in the second frame, then the track tree for the first detected target in the first frame is extended five times, once for each detected target in the second frame: the track tree for the second detected target in the first frame is also extended five times, once for each detected target in the second frame; and so on for all five track trees for the five detected targets in the first frame. Each detection is wrapped in a reference counter to reduce the impact on the system's memory. A reference counter provides multiple pointers to the same data and keeps a count of the number of pointers referencing its data. Each time a track tree is extended, the new segment (referred to herein as a "branch") is associated with a motion vector, and motion metrics are calculated such as angular acceleration, velocity, acceleration, size difference (e.g., difference in the number of pixels in the corresponding clusters between the two frames), and/or angle/heading. Each branch represents the motion vector of a detected target from its beginning location in one frame to its end location in a subsequent frame, which may or may not be the next frame in the frameset, depending on whether or not the target was occluded by foreground imagery or other targets for one or more frames. A track tree may be thought of as a set of tree nodes interconnected by branches, where each branch starts at a tree node corresponding to the beginning of the branch's motion vector and stops at a tree node corresponding to the end of the branch's motion vector.

The computer 106 prunes current track trees for implausible branches. A branch is implausible if any of the motion metrics calculated for the branch are not biologically plausible (e.g., too sharp of a turn based on angular acceleration metric, too fast based on velocity metric, too rapid velocity change based on acceleration metric, too big a change in cluster size based on size difference metric, direction outside an expected range of directions based on angle/heading metric). This pruning makes the track tree a more-tractable computational problem. The biological possibilities are unique to each species and are supplied by the user ahead of time. If any detection of a target becomes orphaned from a track tree, then that target is used to initialize a new track tree that starts in the current frame. A target is considered orphaned if its reference count is equal to 1 (i.e., it has a reference only to itself). If, after pruning (based on the motion characteristics of the volant species), a track tree has not been extended for a specified threshold amount of time, then the target is assumed to have left the field of view, and the track tree becomes a candidate for track selection (i.e., during which one of the tracks in the track tree is selected to be the "true" track for the target). At the conclusion of the frame dataset, all remaining tracks become candidates for track selection.

Figure 7:
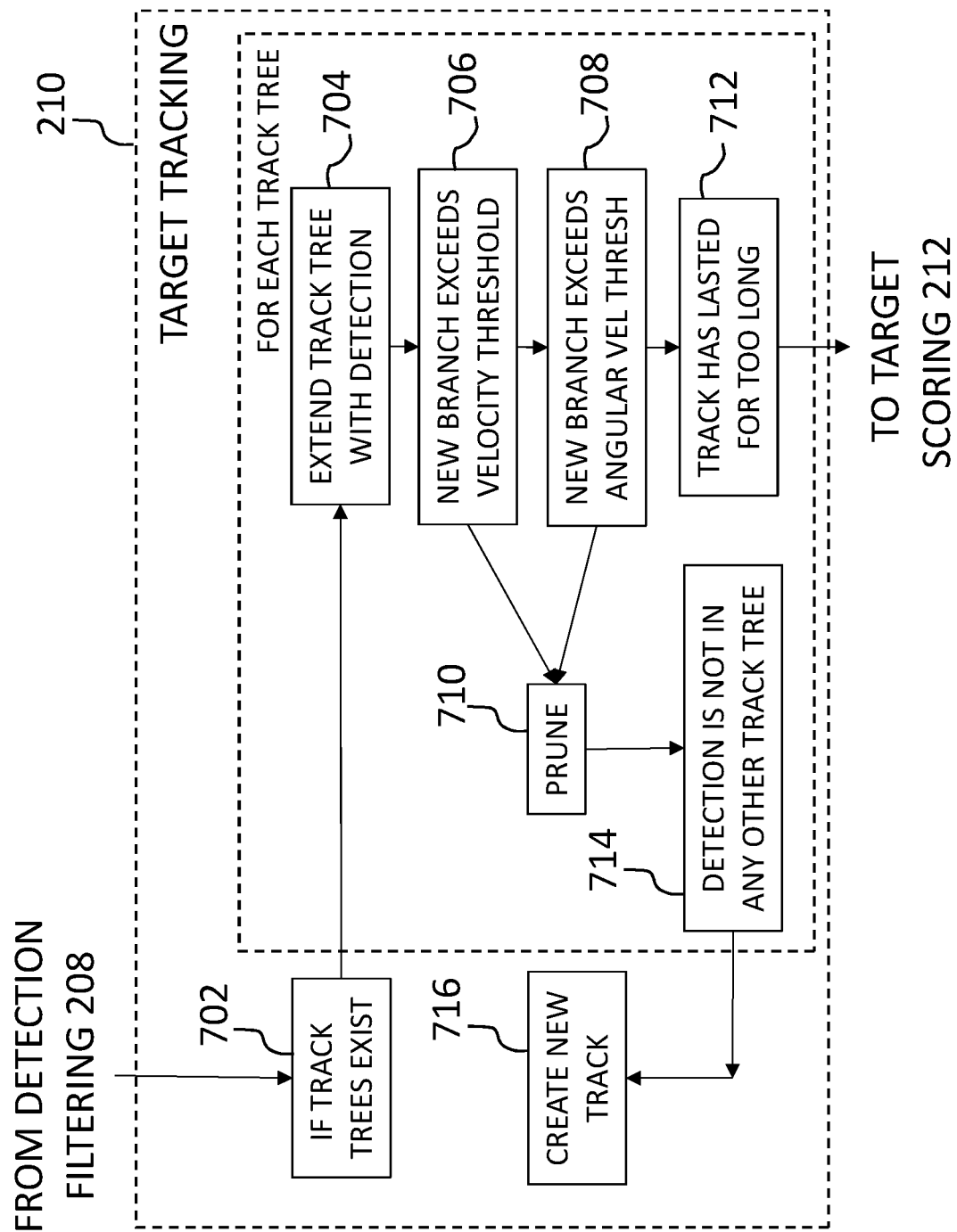
FIG. 7 is a block flow diagram illustrating the step of target tracking and track-tree pruning of FIG. 2.

FIG. 7 is a block flow diagram illustrating the step of target tracking and track-tree pruning 210 of FIG. 2. In one implementation, the processing of FIG. 7 is performed after each frame is completely processed in step 208. In another implementation, the processing of FIG. 7 is performed as soon as each detected target survives the detection filtering of step 208.

A track is a logical association between individual detected targets in two or more different frames. In theory, each target detected in a given frame could be the same volant individual as any one target detected in the next frame. A track tree is a logical construct that represents all of the possible tracks for a particular volant individual. Each track in a track tree is made up of one or more branches, where each branch represents the shortest logical association between an individual detected target in one frame and an individual detected target in a subsequent frame. Note that, when a volant individual become occluded (e.g., by another volant individual or by a foreground element such as a tree or bush), a branch of a track tree may logically connect individual detected targets in non-consecutive frames.

Consider, for example, a first frame containing two detected targets A and B and a second frame containing two detected targets 1 and 2. It is possible that target 1 in the second frame is the same volant individual as target A in the first frame and that target 2 in the second frame is the same volant individual as target B in the first frame. But it is also possible that target 1 in the second frame is the same volant individual as target B in the first frame and that target 2 in the second frame is the same volant individual as target A in the first frame. (Note that it is also possible that one or both of targets A and B left the camera's field of view and are not represented in the second frame and that one or both of targets 1 and 2 just entered the camera's field of view and are not represented in the first frame.) The logical association between target A in the first frame and target 1 in the second frame represents part of a possible track for target A. Similarly, the logical association between target A in the first frame and target 2 in the second frame represents a different possible track for target A. The logical construct that represents both of these possible tracks for target A is a track tree for target A. Similarly, a track tree for target B represent the two possible tracks for target B: a first possible track from target B in the first frame to target 1 in the second frame and a second possible track from target B in the first frame to target 2 in the second frame.

FIG. 7 represents the processing performed for each detected target in the current frame. This processing involves extending each existing track tree (generated based on the previous frame(s)) to include the detected target, pruning the newly extended track tree as appropriate, and if appropriate starting a new track tree for the detected target. Pruning involves the deletion of branches that represent unlikely tracks for actual volant individuals. Some of the pruning is based on expected real-world constraints on the motion of the targets from frame to frame. For a particular volant species, the motion of individuals is expected to be biologically constrained such that limits may be applied to, for example, the linear velocity and the angular velocity of any individual. These biologically informed limits may be applied to reject certain branches in a track tree as representing an unlikely (if not impossible) track by an individual of that particular volant species.

In particular, if the computer 106 determines that there are no existing track trees (e.g., because the current frame is the first frame with any detected targets or because all of the previously generated track trees were terminated), then the computer 106 starts a new track tree for the current detected target in step GH. Otherwise, the computer 106 determines in step 702 that there are one or more existing track trees and processing continues to step 704.

In step 704, for each existing track tree, the computer 106 extends the existing track tree for the detected target. This involves extending each existing track in the track tree by adding a new branch to the detected target. Thus, an existing track tree that had N tracks will have a new branch added to the end of each of those N tracks. In addition, in order to handle targets that may have been previously occluded for one or more frames, new branches are also added to nodes corresponding to earlier frames. In some implementations, a limit is applied on the number of consecutive frames during which a target is allowed to be occluded. In that case, there will be a limit to the number of earlier frames to which branches are added.

If the computer 106 determines in step 706 that any of the new branches exceeds the specified linear velocity threshold for the volant species or if the computer 106 determines in step 708 that any of the new branches exceeds the specified angular velocity threshold for the volant species, then, in step 710, the computer 106 will prune (i.e., delete) those particular new branches from the track tree. Note that linear velocity can be determined based on data from two frames, while angular velocity requires at least three frames of data. If, after extending and pruning all of the track trees for the current detected target, the computer 106 determines in step GG that the detected target is not represented in any existing track tree, then, in step GH, the computer 106 starts a new track tree for the "orphaned" detected target.

In addition to motion constraints, time constraints can also be applied to track trees. For example, it may be expected that individuals of a particular volant species will remain within the field of view of the camera 102 for less than some specified maximum duration. In that case, if the computer 106 determines in step 712 that the track tree has existed for too long, then the computer 106 will terminate the track tree and pass it on to the track scoring step 212 of FIG. 2.

By pruning the track trees based on (biologically informed) motion constraints, the target tracking and tracktree pruning step 210 of FIG. 7 can inhibit track trees from growing exponentially from frame to frame. In this way, the pruning keeps the overall processing load on the computer 106 to a level such that the overall processing 200 of FIG. 2 can be implemented in real time using a modest amount of provisioned computer resources.

Track Scoring

The computer 106 terminates the track tree for a given detected target after determining that the track tree has not been extended for a specified threshold amount of time indicating, for example, that the target has left the camera's FoV. If the frameset has a fixed size, then the computer 106 will terminate all existing track trees at the end of the frameset. Either way, for each terminated track tree, if the track tree still has multiple tracks after being pruned in step 210, the computer 106 scores the different tracks in the track tree (in the track scoring step 212 of FIG. 2) and selects a single track as representing the most likely track (aka the "true" track) for the detected target (in the track selection step 214 of FIG. 2).

Figure 8:
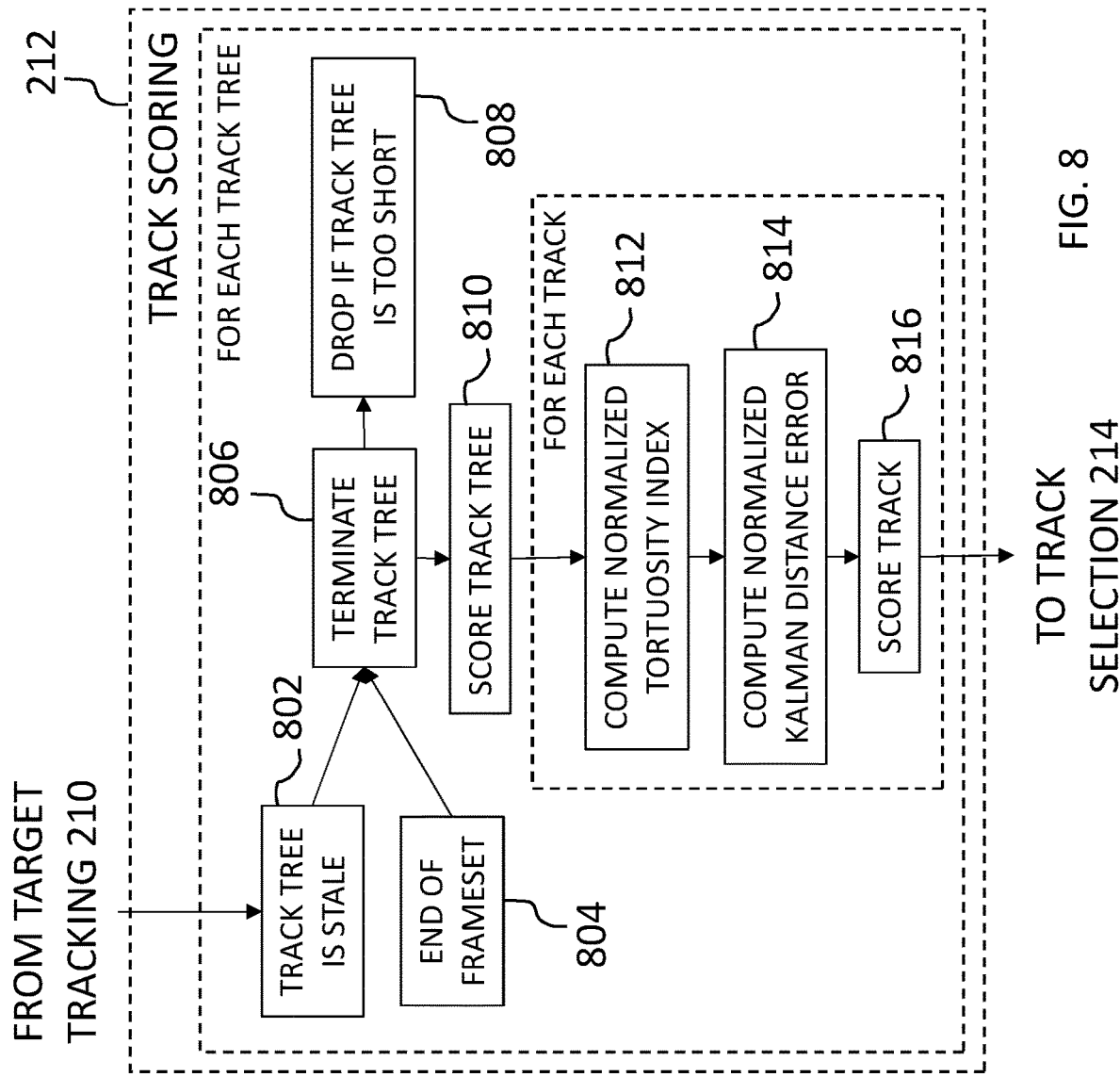
FIG. 8 is a block flow diagram illustrating the step of track scoring of FIG. 2 for an individual track tree.

FIG. 8 is a block flow diagram illustrating the step of track scoring 212 of FIG. 2 for an individual track tree. In one implementation, the processing of FIG. 8 is performed after each frame is completely processed in step 210. In another implementation, the processing of FIG. 8 is performed as soon as a track tree has been pruned in step 210.

If the computer 106 determines in step 802 that the current track tree has not been extended for the specified threshold amount of time or in step 804 that the end of the frameset has been reached, then the computer 106 terminates the track tree in step 806. Otherwise, the current track tree is not terminated and the processing of FIG. 8 for the current track tree is completed. In that case, the current track tree remains an existing track tree for the next frame and no further processing on the current track tree will be performed (i.e., steps 214, 216, and 218 of FIG. 2 will not be performed for the current track tree).

If, in step 808, the computer 106 determines that the now-terminated current track tree has existed for too short a duration, then the computer 106 deletes the track tree. In general, a short track tree might not have enough of the different motion metrics for proper evaluation.

Otherwise, in step 810, the computer 106 determines that the current track tree is to be scored. For each track in the track tree, the computer 106 generates a track score C that is the product of two metrics: a normalized tortuosity metric T and a normalized distance error metric D.

In step 812, the computer 106 generates the normalized tortuosity metric T as $U(C*T_{max})$, where L is the total track length (i.e., the sum of the lengths of the branches in the track). C is the net displacement of the track (i.e., the distance from the start of the track to the end of the track), and $T_{max}$ is the maximum tortuosity for all of the tracks in the current track tree. The length of a branch is the intra-frame distance from the location of the target in one frame to the location of the target in a subsequent frame. Similarly, the net displacement is the intra-frame distance from the location of the target in the frame corresponding to the beginning of the track to the location of the target in the frame corresponding to the end of the track.

The normalized tortuosity metric T represents the relative straightness of a track compared to the other tracks in the same track tree, where straighter tracks will have smaller T values. Given biologically informed flight characteristics, straighter flight paths can be safely assumed to yield higher fidelity tracks, even through occlusion events. The tortuosity index is a measure of path straightness and allows the system to handle the occlusion of volant individuals by other volant individuals or by foreground elements over one or more frames.

In step 814, the computer 106 generates the normalized distance error metric D as $S/S_{max}$ where S is the sum of the errors between a Kalman prediction and an observation of each branch of the track, and $S_{max}$ is the maximum sum for the tracks of the current track tree. The sum S is a predicted error based on the sum of the relative positional error from a Kalman filter prediction for each branch of the track. The normalized metric D is a relative positional error of each track for the corresponding track tree. Tracks having smaller D values are more likely to be the true track for the target.

In step 816, the computer 106 generates the track score C for each track in the track tree as T*D.

Track Selection

Figure 9:
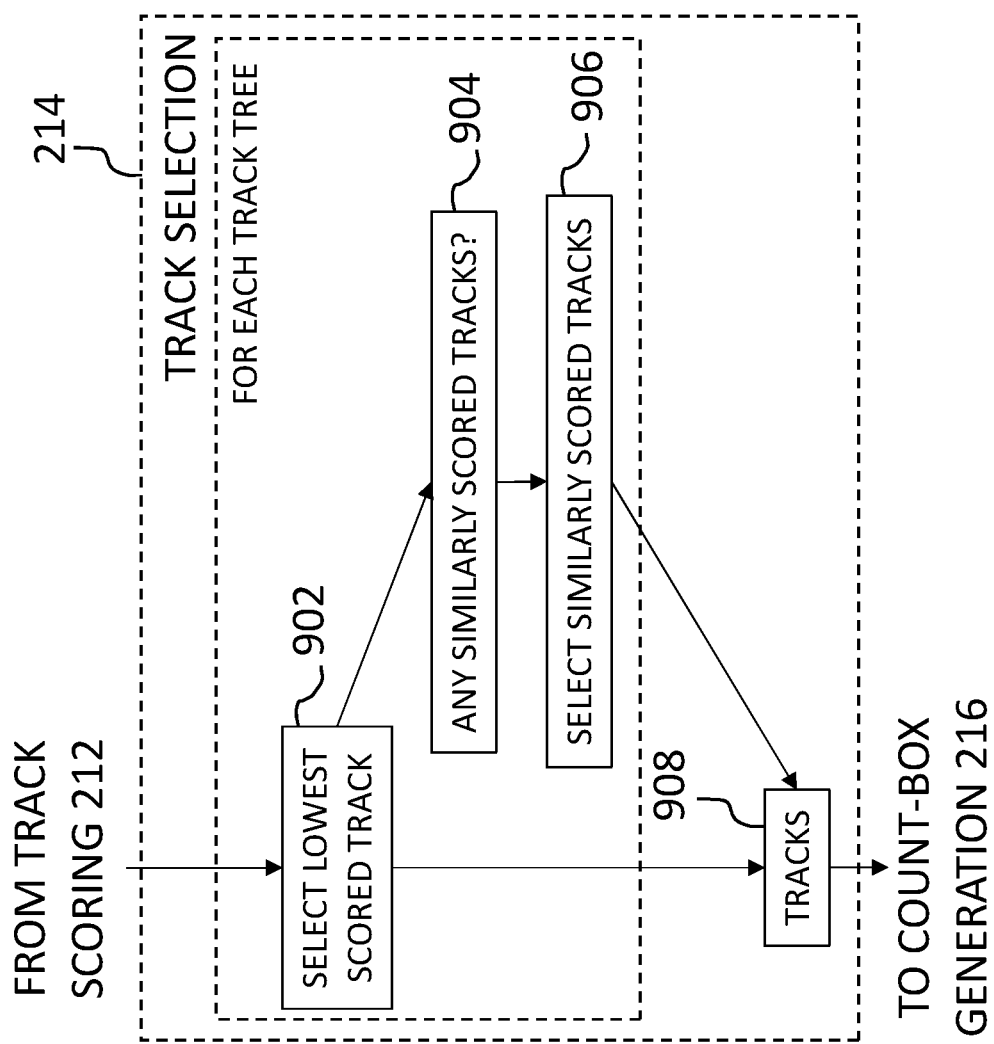
FIG. 9 is a block flow diagram illustrating the step of track selection of FIG. 2 for an individual track tree.

FIG. 9 is a block flow diagram illustrating the step of track selection 214 of FIG. 2 for an individual track tree. In one implementation, the processing of FIG. 9 is performed after each frame is completely processed in step 212. In another implementation, the processing of FIG. 9 is performed as soon as all of the tracks in a track tree have been scored in step 212.

In step 902, the computer 106 selects the track having the smallest track score C to be the true track for the corresponding detected target.

It is possible that, in the initial frame for the current track tree, the detected target corresponded to a situation in which a first volant individual occluded one or more other volant individuals that emerged from behind the first volant individual in subsequent frames. In that case, the current track tree would have multiple tracks that represent actual volant individuals. As such, the track score C for each of those tracks should be relatively small. (In fact, the track having the smallest C value is just as likely to correspond to an occluded individual in the initial frame as it is to correspond to the original occluding individual.) As such, in step 904, the computer 106 determines if any other tracks in the current track tree have similar, small track score C values. This determination can be made by the computer 106 thresholding the difference between the C value for each path in the path tree and the smallest C value. If so, then, in step 906, the computer 106 determines that those other tracks are also true tracks for volant individuals.

In step 908, the computer 106 serializes the one or more true tracks to files for the subsequent processing of steps 216 and 218 of FIG. 2. The current, terminated track tree is then deleted from the computer's memory, thereby reducing the reference count for each detected target in the deleted track tree by 1. Targets with a reference count of 1 are removed from the computers memory, while targets with a reference count greater than 1 are retained within the working set of active track trees.

Count-Box Generation

One application of the tracking system 100 of FIG. 1 is to generate a census of the detected and tracked targets (e.g., volant individuals). Depending on the particular implementation, the census can be a single value representing the total number of targets detected and tracked over the frameset or a running set of values representing the numbers of targets detected and tracked over different time periods represented by subsets of the generated frames. In the processing 200 of FIG. 2, a census involves (i) the generation of one or more count boxes as represented in step 216 and (ii) the counting of the number of individual targets located within each count box for the relevant set or subset of frames as represented in step 218

A count box is a particular region of interest within the field of view of camera 102. For example, when the tracking system 100 is used to determine a census of bats and the camera's field of view includes the mouth of a cave within which the bats roost, the count box may correspond to a region in the camera's FoV that spans the mouth of the cave. On the other hand, when the field of view contains only a flight path for the bats and not the cave entrance itself, there may be two count boxes: one count box on one side of the frames corresponding to the detected bats entering the camera's FoV and the other count box on the other side of the frames corresponding to the detected bats leaving the camera's FoV. In the tracking system 100, the computer 106 allows the user to generate count boxes manually using conventional techniques. In some implementations, the computer 106 can also automatically generate count boxes without user intervention.

Figure 10:
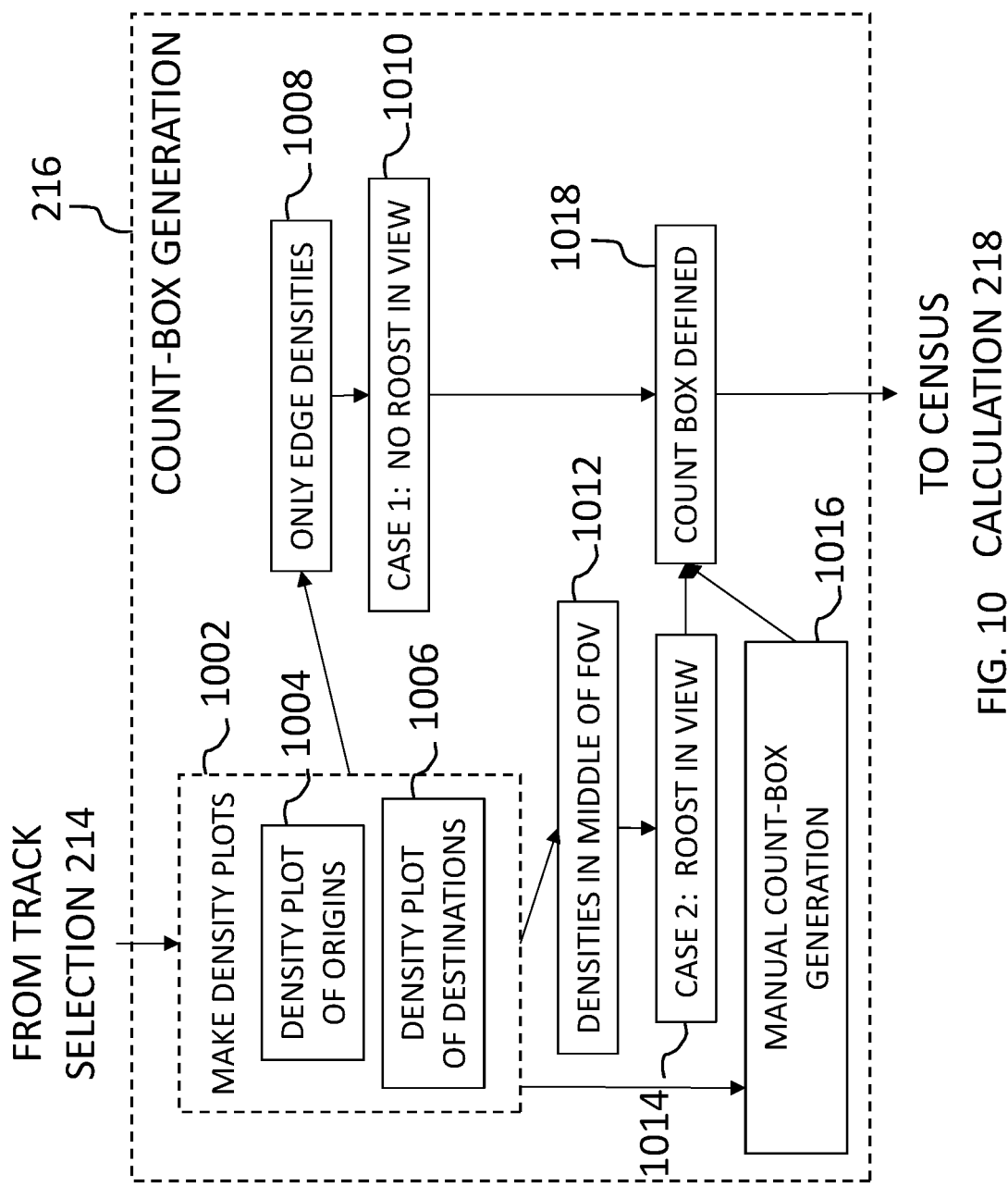
FIG. 10 is a block flow diagram illustrating the step of count-box generation of FIG. 2.

FIG. 10 is a block flow diagram illustrating the step of count-box generation 216 of FIG. 2. In one implementation, the processing of FIG. 10 is performed on the true tracks selected in step 214 for each set or subset of completely processed frames. In another implementation, the processing of FIG. 10 is performed on the true tracks selected in step 214 after each frame is processed.

In step 1002, the computer 106 generates density plots based on the true tracks selected during the track selection step 214 of FIG. 2, where each track has an origin representing the location within the camera's FoV at which the corresponding target was first detected and a destination representing the location within the camera's FoV at which the corresponding target was last detected. In particular, in sub-step 1004, the computer 106 generates a plot of the origins for all the detected targets and, in sub-step 1006, the computer 106 generates a plot of the destinations for all the detected targets.

If the computer 106 determines, in step 1008, that the high-density regions for each plot (e.g., >=0.5*max(density)) lie at the edge of the camera's FoV, then, in step 1010, the computer 106 determines that the bats' roost (e.g., a cave entrance) is not within the FoV of the camera. In that case, in step 1018, the computer 106 generates one or more origin count boxes corresponding to the high-density regions in the origin plot and/or one or more destination count boxes corresponding to the high-density regions in the destination plot.

If, on the other hand, the computer 106 determines, in step 1012, that at least one of the two plots has its high-density regions within the interior of the camera's FoV, then, in step 1014, the computer 106 determines that the bats' roost is within the FoV of the camera. In that case, in step 1018, the computer 106 generates one or more roost count boxes corresponding to those interior, high-density regions. Note that it is possible (i) for both the origin plot and the destination plot to have their high-density regions corresponding to the roost (e.g., for situations in which many bats are leaving the roost and many bats are entering the roost during the current set/subset of frames) or (ii) for only one plot to have its high-density regions corresponding to the roost (e.g., for situations in which many bats are leaving the roost or many bats are entering the roost during the current set/subset of frames, but not both).

In some situations, both plots might be sufficiently diffuse (e.g., having all region densities below a specified density threshold level) such that the automatic generation of count boxes will be unreliable. In that case, the computer 106 will determine in step 1016 that the user should define one or more count boxes manually using a conventional technique in step 1018.

Either way, the one or more count boxes for the current set or subset of frames is passed to the census calculation step 218 of FIG. 2.

Census Calculation

Figure 11:
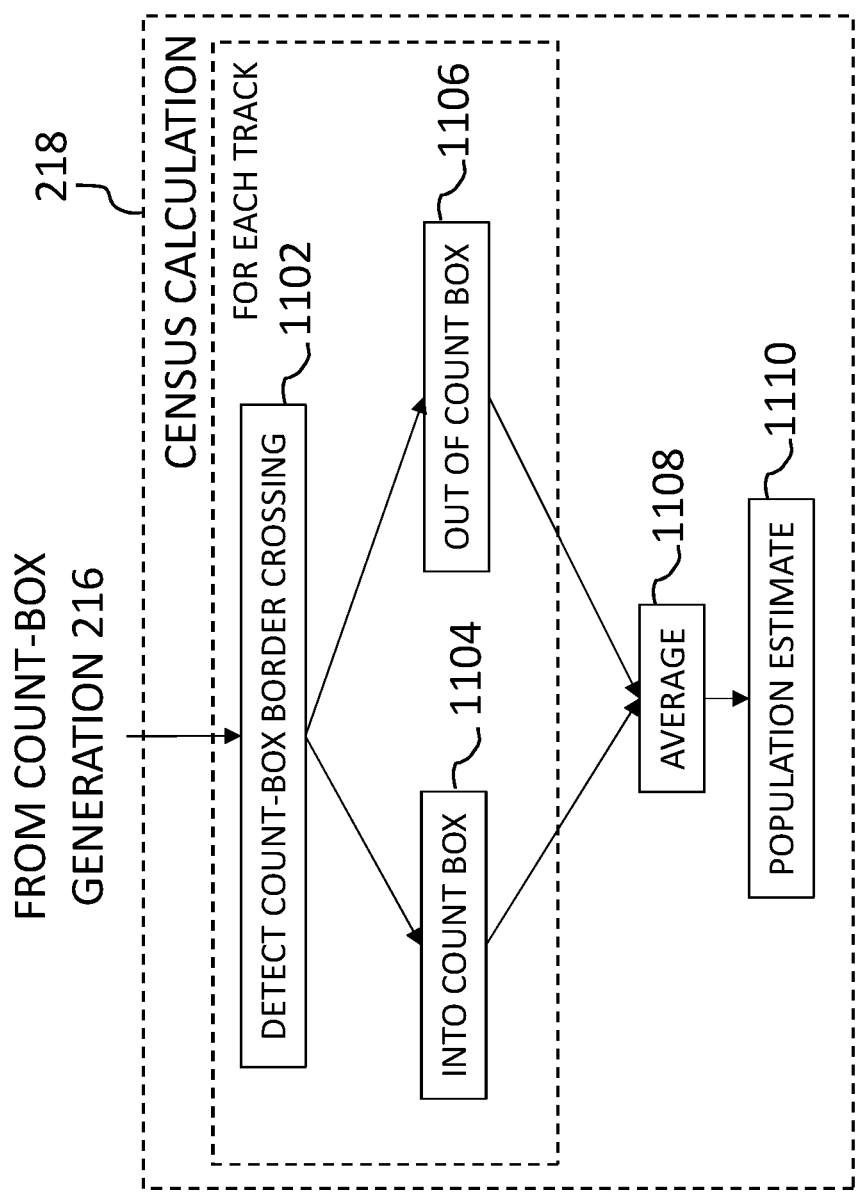
FIG. 11 is a block flow diagram illustrating the step of census calculation of FIG. 2.

FIG. 11 is a block flow diagram illustrating the step of census calculation 218 of FIG. 2. In one implementation, the processing of FIG. 11 is performed on the true tracks selected in step 214 and the count boxes generated in step 216 for each set or subset of completely processed frames. In another implementation, the processing of FIG. 11 is performed on the true tracks selected in step 214 and the count boxes generated in step 216 after each frame is processed.

A census of volant individuals is conducted based on selected tracks of the detected targets relative to the positions of particular types of count boxes. For each detected target, if the computer 106 determines in step 1102 that the target started outside of a destination count box and ended within that destination count box, then the computer 106 increments an ingress counter for that destination count box in step 1104. If, on the other hand, the computer 106 determines in step 1102 that the target started inside an origin count box and ended outside that origin count box, then the computer 106 increments an egress counter for that origin count box in step 1106.

If the computer 106 determines in step 1102 that the target started outside of a roost count box and ended within that roost count box, then the computer 106 increments a roost counter for that roost count box in step 1104. If, on the other hand, the computer 106 determines in step 1102 that the target started inside the roost count box and ended outside that roost count box, then the computer 106 decrements the roost counter for that roost count box in step 1106.

The computer 106 performs steps 1102, 1104, and 1106 for each detected target having a selected track in the current set/subset of frames.

In step 1108, if desired, the computer 106 can average the various counters over multiple different time periods corresponding to different sets/subsets of frames to generate an average count for each count box over those time periods.

In step 1110, the computer 106 generates a population estimate for the detected targets over the relevant time period. For a situation in which the camera's FoV includes the targets' roost, the computer 106 can generate the population estimate by summing up the counts over the one or more different roost counters. For a situation in which the camera's FoV includes one or more origin count boxes, the computer 106 can generate the population estimate by summing up the counts over the one or more different egress counters. Alternatively, for a situation in which the camera's FoV includes one or more destination count boxes, the computer 106 can generate the population estimate by summing up the counts over the one or more different ingress counters. In another implementation, the computer 106 can generate the population estimate based on the difference between the total egress count and the total ingress count.

SUMMARY

The use of thermal infrared imagery generated using an uncooled microbolometer focal plane array is a well-proven detection technology for the tracking and census of volant wildlife. The initial T3 architecture and design had both hardware, software, and methodological limitations, which are addressed by certain implementations of the BIMHTA tracking system 100 of FIG. 1. Hardware improvements enable the use of lightweight batteries, modem digital thermal imagers, and longer collection periods. Software improvements have made certain implementations of the BIMHTA tracking system 100 more flexible, able to support multiple background-filtering approaches, multiple operating systems, the use of different polarities for tracking, a faster target detection algorithm (e.g., HKUF), a focus on long-term deployments, a focus on real-time computation, a standardized automatic mechanism for count-box generation, and a data-oriented software design.

The BIMHTA methodology improves track fidelity which enables reliable, automated census to be conducted. BIMHTA is a superior tracking methodology because it uses biological information to justify the rejection of the classic MHT assumptions for this use case. Further, BIMHTA enables the incorporation of track history to formulate higher fidelity tracks of volant individuals. The track-tree approach, which delays decisions about what constitutes a track, enables better tracking through occlusion caused by foreground objects and other volant individuals. Based on recent innovation, the BIMHTA tracking system 100 should serve as a robust replacement for the original T3 system.

Through the BIMHTA approach, it is possible to generate superior tracking fidelity compared to existing approaches. The biological information is a non-obvious extension of the MHT methodology because it requires a rejection of the MHT's classic assumptions. Further, it incorporates track history into the track formation decision in a way not possible using the non-tree approach used in the T3 system. The BIMHTA procedure, with its higher confidence in track fidelity for volant individuals, enables the automation of count-box generation, a capability not possible or considered by any prior methods. Automatic count-box generation is biologically informed through high-fidelity tracks provided by the tracking system.

In one embodiment, the invention is a machine-implemented method for detecting moving targets. The method comprises (a) the machine generating a track tree for each of one or more targets detected in a set of images; (b) the machine extending each of one or more track trees by adding one or more new branches for each of one or more targets detected in a subsequent image; (c) the machine generating one or more motion metrics for each of one or more new branches of each of one or more extended track trees; (d) the machine applying one or more motion constraints to the one or more motion metrics to determine whether to delete one or more new branches from one or more track trees; and (e) the machine selecting at least one track in each of one or more track trees as a most likely track for the corresponding detected target.

In certain embodiments of the foregoing, each image is a thermal image, the targets are volant animals, and at least one motion constraint is a biologically informed motion constraint for the volant animals.

In certain embodiments of the foregoing, the one or more motion metrics comprise one or more of angular acceleration, velocity, acceleration, size difference, and angle/heading. If angular acceleration is a motion metric, then a corresponding motion constraint is a maximum angular acceleration value. If velocity is a motion metric, then a corresponding motion constraint is a maximum velocity value. If acceleration is a motion metric, then a corresponding motion constraint is a maximum acceleration value. If size difference is a motion metric, then a corresponding motion constraint is a maximum size difference value. If angle or heading is a motion metric, then a corresponding motion constraint is an expected range of directions.

In certain embodiments of the foregoing, step (b) comprises the machine extending a track tree by adding one or more new branches corresponding to the detected target being occluded for one or more images.

In certain embodiments of the foregoing, the machine implements a modified Hoshen-Koppelman Union-Find (HKUF) technique to detect targets in images.

In certain embodiments of the foregoing, step (e) comprises (e1) the machine generating a track score for each track in a track tree having multiple tracks and (e2) the machine selecting the most likely track in the track tree for the corresponding detected target based on the track scores for the track tree.

In certain embodiments of the foregoing, each track score is a product of first and second metrics for a track, the first metric is a sum of relative positional errors from Kalman filter predictions for the branches of the track, the second metric is a tortuosity index for the track, and the most likely track in the track tree is the track having the smallest track score.

In certain embodiments of the foregoing, step (e) further comprises (e3) the machine selecting at least one additional track in the track tree as a most likely track for at least one occluded target based on the track scores for the track tree.

In certain embodiments of the foregoing, the method further comprises (f) the machine automatically generating at least one count box based on the selected, most likely tracks and (g) the machine calculating a census of the detected targets based on the selected, most likely tracks relative to the at least one automatically generated count box.

In certain embodiments of the foregoing, step (f) comprises (f1) the machine generating one or more density plots based on the selected, most likely tracks; and (f2) the machine automatically generating the at least one count box based on the one or more density plots.

In another embodiment, the invention is the aforementioned machine.

In yet another embodiment, the invention is a machine-implemented method for calculating a census of detected moving targets. The method comprises (a) the machine generating a most likely track for each moving target detected in a set of images; (b) the machine generating one or more density plots based on the selected, most likely tracks; (c) the machine automatically generating at least one count box based on the one or more density plots; and (d) the machine calculating the census based on the selected, most likely tracks relative to the at least one automatically generated count box.

In still another embodiment, the invention is the aforementioned machine.

Although the invention has been described in the context of tracking individuals of a single volant species, such as bats or birds, in some implementations, the invention can distinguish between bats and birds in the same thermal imagery. In particular, for a typical bird, the bird's body and wings are typically warmer than the ambient background. For many bats, on the other hand, the bat's body is relatively warm, while its wings are cooler than the ambient background. These characteristics of birds and bats and the corresponding positive and negative pixel values associated with them can be used to enable the computer to distinguish between individual birds and individual bats in the same thermal imagery.

Although the invention has been described in the context of tracking volant species, such as bats and birds, having biologically informed motion constraints, those skilled in the art will understand that the invention can be implemented in the context of tracking other suitable types of moving objects, such as (without limitation) landcraft, watercraft, aircraft, and projectiles having their own constraints on motion.

Although the invention has been described in the context of thermal imaging, those skilled in the art will understand that the invention can be implemented in the context of other types of imaging based on other frequencies of electromagnetic radiation as well as those based on vibrations in gases (e.g., air), water, or solids (e.g., earth) or other types of radiation (e.g., cosmic rays, alpha or beta particles).

Although the invention has been described in the context of the tracking system 100 of FIG. 1 performing the processing 200 of FIG. 2, those skilled in the art will understand that the tracking system 100 can be used to perform other processing. For example, the tracking system 100 can be used to detect and track targets without generating a census of those targets.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system."

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:
1. A machine-implemented method for detecting moving targets, the method comprising:
(a) the machine generating a track tree for each of one or more targets detected in a set of images;

(b) the machine extending each one or more track trees by adding one or more new branches for each of one or more targets detected in a subsequent image;
(c) the machine generating one or more motion metrics for each of one or more new branches of each of one or more extended track trees;
(d) the machine applying one or more motion constraints to the one or more motion metrics to determine whether to delete one or more new branches from one or more track trees; and
(e) the machine selecting at least one track in each of one or more track trees as a most likely track for the corresponding detected target, and (e1) the machine generating a track score for each track in a track tree having multiple tracks; and (e2) the machine selecting the most likely track in the track tree for the corresponding detected target based on the track scores for the track tree;

and wherein: each track score is a product of first and second metrics for a track; the first metric is a sum of relative positional errors from Kalman filter predictions for the branches of the track; the second metric is a tortuosity index for the track; and the most likely track in the track tree is the track having the smallest track score.

2. The method of claim 1, wherein: each image is a thermal image; the targets are volant animals; and at least one motion constraint is a biologically informed motion constraint for the volant animals.

3. The method of claim 1, wherein: the one or more motion metrics comprise one or more of angular acceleration, velocity, acceleration, size difference, and angle/heading; if angular acceleration is a motion metric, then a corresponding motion constraint is a maximum angular acceleration value; if velocity is a motion metric, then a corresponding motion constraint is a maximum velocity value; if acceleration is a motion metric, then a corresponding motion constraint is a maximum acceleration value; if size difference is a motion metric, then a corresponding motion constraint is a maximum size difference value; and if angle or heading is a motion metric, then a corresponding motion constraint is an expected range of directions.

4. The method of claim 1, wherein step (b) comprises the machine extending a track tree by adding one or more new branches corresponding to the detected target being occluded for one or more images.

5. The method of claim 1, wherein the machine implements a modified Hoshen-Koppel man Union-Find (HKUF) technique to detect targets in images.

6. The method of claim 1, wherein step (e) further comprises: (e3) the machine selecting at least one additional track in the track tree as a most likely track for at least one occluded target based on the track scores for the track tree.

7. The method of claim 1, further comprising: (f) the machine automatically generating at least one count box based on the selected, most likely tracks; and (g) the machine calculating a census of the detected targets based on the selected, most likely tracks relative to the at least one automatically generated count box.

8. The method of claim 7, wherein step (f) comprises: (f1) the machine generating one or more density plots based on the selected, most likely tracks; and (f2) the machine automatically generating the at least one count box based on the one or more density plots.

* * * * *